Sept. 27, 1927.  T. G. DADE  1,643,700
WHEEL
Filed Dec. 23, 1925
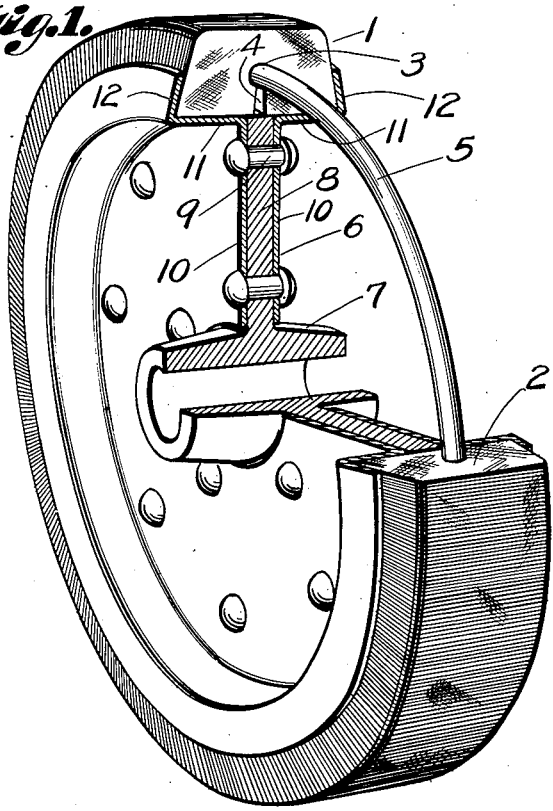
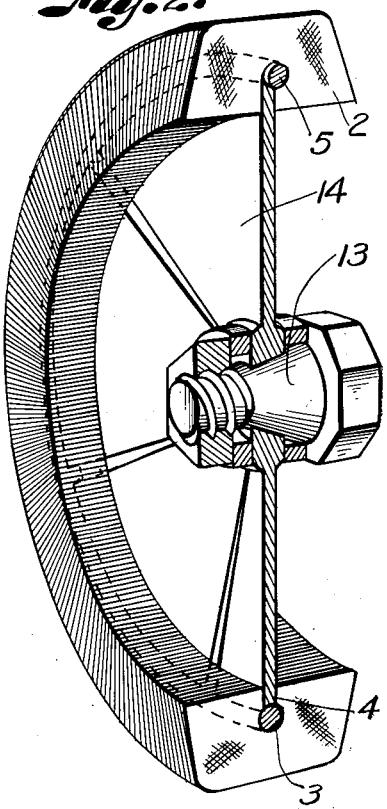
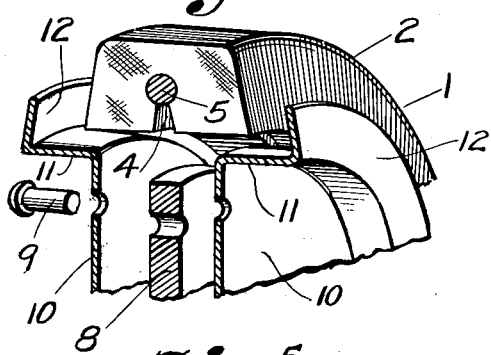
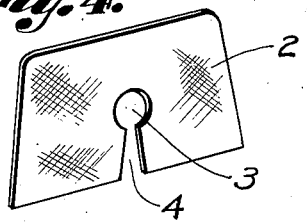
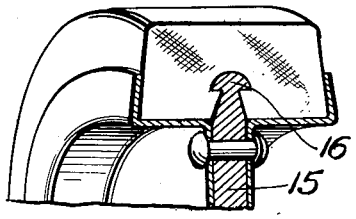
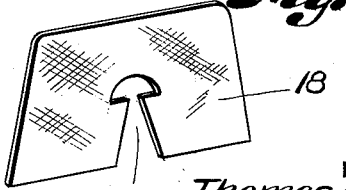
INVENTOR
Thomas G. Dade.
BY
ATTORNEY Patented Sept. 27, 1927.

1,643,700

UNITED STATES PATENT OFFICE.

THOMAS G. DADE, OF DAYTON, OHIO.

WHEEL.

Application filed December 23, 1925. Serial No. 77,340.

My invention relates to wheels, and more particularly to one for polishing purposes, although the improvement may be adapted to platform-truck or other wheels, the principal object of the invention being to provide a wheel comprising a tire, herein termed a rim of leather, felt, woven fabric or other soft, compressible material, hereinafter referred to as "fabric," and a body of metal or other suitable material, including elements whereby the rim may be easily and quickly applied to or removed from the body for replacement or repairs and whereby the rim is securely held to the body when the parts are assembled.

In accomplishing this and other objects of the invention I have provided improved details of structure, the preferred forms of which are illustrated in the accompanying drawings wherein:—

Fig. 1 is a perspective view of a wheel embodying my improvements, a part being broken away for better illustration.

Fig. 2 is a perspective view of a portion of a wheel rim and temporary center, illustrating the method for supporting the anchor ring while the rim segments are being assembled.

Fig. 3 is a detail perspective view of a portion of the wheel illustrated in Fig. 1, the parts being in spaced but relative relation, particularly illustrating the assembly.

Fig. 4 is a detail perspective view of one of the fabric strips or segments of which the rim is composed, illustrating a strip of the preferred form.

Fig. 5 is a detail perspective view of a portion of a modified form of wheel.

Fig. 6 is a perspective view of a strip for use in the modified form illustrated in Fig. 5.

Referring more in detail to the drawings:—

1 designates the tire, herein termed the rim of a wheel of my improved construction and which is composed of strips 2 of heavy canvas or other suitable fabric, of substantially rectangular shape but slightly tapered toward their outer edges, each having a circular recess 3 at about its center and having a throat 4 opening from its wider edge to the recess 3; the throat being preferably tapered to form an enlarged mouth through which a ring 5 or the like may be projected to seat within the recess 3 and retain the strips in position.

6 designates a wheel of any suitable construction adapted to receive the rim 1, but preferably comprising a hub 7 and web 8. Fixed to opposite sides of the web 8, preferably by rivets or bolts 9 are plates 10, each having a laterally turned felloe flange 11 provided with an out-turned, slightly inbent keeper flange 12 for receiving the rim 1, so that when the plates are drawn tightly together against the web 8, the inturned keeper flanges firmly grip the inclined edges of the fabric rim, locking it in place and maintaining a high degree of compression upon the assembled strips and tending to close the throats 4 to retain the ring 5.

In assembling a wheel constructed as described, a sufficient number of strips are placed face to face, with their recesses and throats aligning, to form a continuous rim of a diameter somewhat larger than that of the finished wheel. Anchor ring 5 is then applied to a temporary wheel center composed of segments 14 which are assembled within the anchor ring and expanded against the inner periphery thereof by the tapered bolt 13 to hold the ring in position while the rim is being assembled and centripetally compressed thereon, the throats 4 receiving the anchor ring and the ends of the segments. When the rim ring has been compressed enough to permit the anchor ring to enter the recesses 3, the segments 14 are removed by removing the tapered bolt 13 which permits the temporary center to collapse, the throat in the strips closing beneath the anchor ring and locking it in place, thereby embodying the ring as a part of the rim structure. One of the wheel plates 10 is then applied to the wheel web 8 and the rim seated on the felloe flange and within the angle formed by the felloe and keeper flanges. The other plate 10 is then applied to the wheel web and to the rim, and the bolts or rivets secured in place to attach the web plates to the wheel and bind the keeper flanges against opposite sides of the fabric rim to complete the wheel.

The fabric of the rim may be treated if desired to better adapt it for the particular purpose for which the wheel is to be employed, as for buffing, polishing or for ground travel in case the wheel is to be used in connection with platform or like trucks.

It is apparent that the wheel so constructed is well adapted for ordinary buffing and polishing uses and as the strips may be closely compressed to form a subtantially integral structure, it is capable of supporting a considerable weight, so that it may be well adapted for use in connection with platform or like trucks where avoidance of noise and jar is an object.

The form of wheel illustrated in Fig. 5 varies but little from that of Fig. 1, the only difference being that the web plate 15, similar to the plate 8 in the preferred form, is provided with a peripheral flange 16, spear shaped in cross section to receive the spear shaped slots 17 in the strips 18 illustrated in Fig. 6. In this form of wheel the strips of fabric are compressed directly upon the wheel web flange performing the same function as the ring 5 in the preferred form and the same general result is secured in that a plurality of separate pieces of fabric are united to form a substantially integral rim.

What I claim and desire to secure by Letters Patent is:—

1. A tire for mounting on a wheel comprising a web, plates on opposite sides of the web having felloe flanges and anchoring flanges at the edges of the felloe flanges, said tire composed of a plurality of strips of fabric laid face to face to form an annular fabric unit, the strips having registering openings and throats leading from said openings through the inner edges of the strips, and an anchoring member designed to seat in said registering openings, the annular fabric unit being centripetally compressed onto said anchoring member.

2. A tire for mounting on a wheel including a web and clamping plates having inturned flanges comprising, an anchor annulus, strips having registering openings and throats leading from said openings to the inner edges of the strips, installable on said anchor annulus by centripetal compression, the throated portions of the strips being adapted for constriction between said inturned flanges upon clamping of the plates.

In testimony whereof I affix my signature.

THOMAS G. DADE.